(12) United States Patent
Schieven

(10) Patent No.: US 9,056,277 B1
(45) Date of Patent: Jun. 16, 2015

(54) FILTER COATING COMPOSITION AND METHOD

(71) Applicant: Johannes Schieven, Abbotsford (CA)

(72) Inventor: Johannes Schieven, Abbotsford (CA)

(*) Notice: Subject to any disclaimer, the term of this patent is extended or adjusted under 35 U.S.C. 154(b) by 110 days.

(21) Appl. No.: 13/828,326

(22) Filed: Mar. 14, 2013

(51) Int. Cl.
*A61L 2/00* (2006.01)
*B01J 19/08* (2006.01)
*B03C 3/00* (2006.01)
*B01D 53/02* (2006.01)
*C25B 5/00* (2006.01)
*B01D 53/86* (2006.01)

(52) U.S. Cl.
CPC .................. *B01D 53/8675* (2013.01)

(58) Field of Classification Search
CPC ............ A61L 9/00; B01D 53/34; B03C 3/00
USPC .......... 422/22, 186.04; 204/155, 164; 55/522; 95/2, 57, 90, 285; 96/15, 108
See application file for complete search history.

(56) References Cited

U.S. PATENT DOCUMENTS

| 3,626,669 | A | 12/1971 | Cardiff |
| 4,643,745 | A | 2/1987 | Sakakibara et al. |
| 6,375,905 | B1* | 4/2002 | Moini et al. .................. 422/180 |
| 2005/0174062 | A1* | 8/2005 | Tanaka et al. ............ 315/111.21 |
| 2008/0193354 | A1* | 8/2008 | Chen et al. .................... 423/247 |
| 2011/0038771 | A1 | 2/2011 | Buelow et al. |

FOREIGN PATENT DOCUMENTS

WO     WO2011041144     4/2011

OTHER PUBLICATIONS

3M Products, 3M High Air Flow (HAF) Filters, Mar. 10, 2013, www.solutions.3m.com/wps/portal/3M/3n_US/Liquid_Filtrete_Commi_Air/Products/Other/HAF-Media/.

* cited by examiner

*Primary Examiner* — Monzer R Chorbaji
(74) *Attorney, Agent, or Firm* — Dwayne E. Rogge; Schacht Law Office, Inc.

(57) ABSTRACT

Disclosed herein are examples of open mesh style monolith filters utilizing an ozone-depleting catalyst. In addition, pairing of an ozone depletion coated filter with electrostatic filter is disclosed herein such that the electrostatic filter is provided upstream of the ozone depletion coated filter so as to reduce the volume of particulates encountered by the ozone depletion coated filter and thus extending the useful life of the ozone depletion coated filter. In addition, pairing of the treated filter as well as the combined treated filter and electrostatically charged filter with an air ionizer is disclosed herein so as to further reduce particulates in the air stream, reduce chemical contaminants in the air stream, and provide a low pressure airflow through the filter. A method for making an economical ozone depletion filter that is energy efficient (with open mesh monolith structure) with high air cleaning efficiency at ambient temperature.

10 Claims, 8 Drawing Sheets

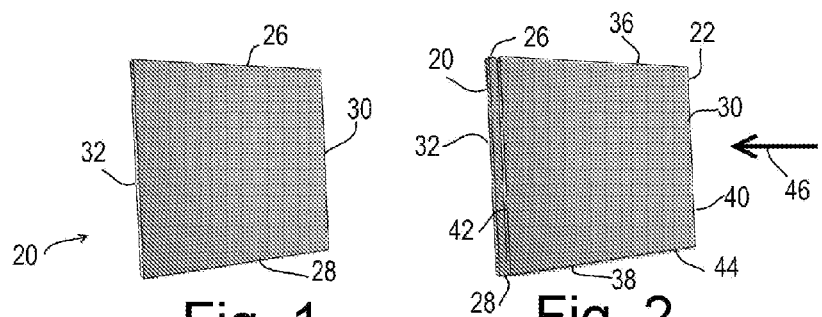
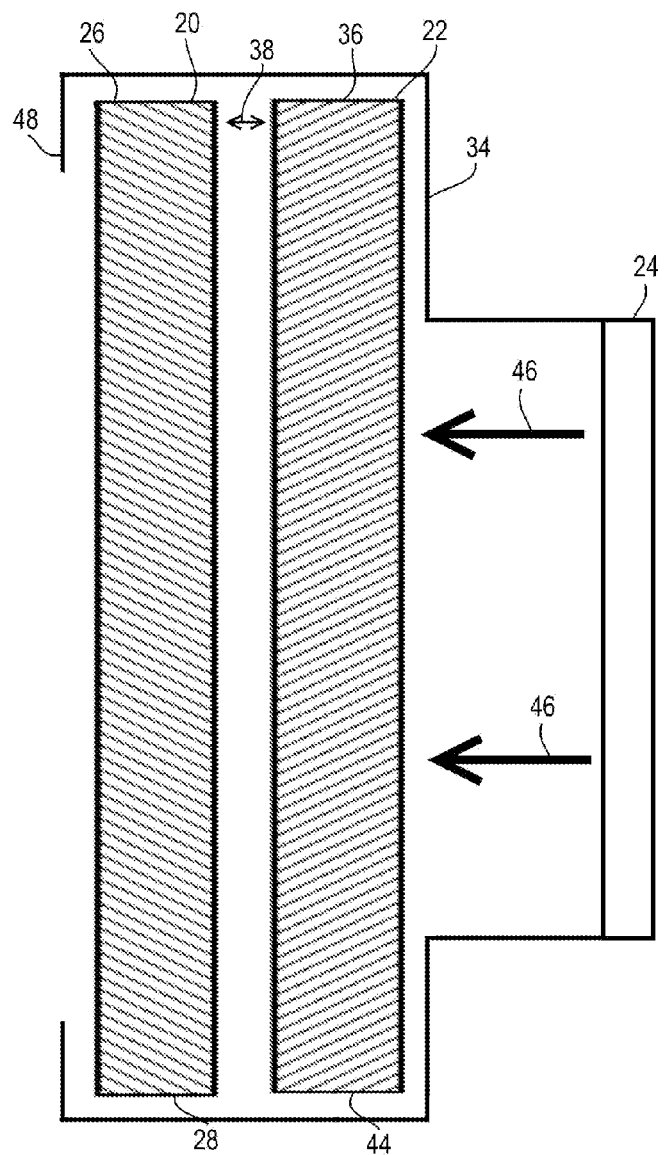
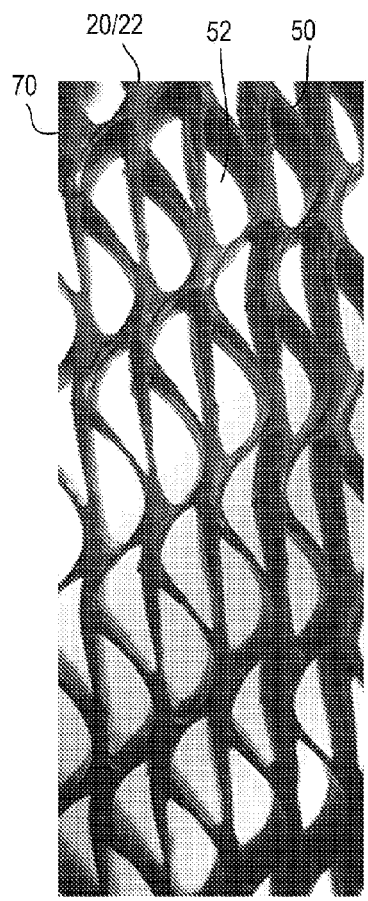
Fig. 1
Fig. 2
Fig. 3
Fig. 4

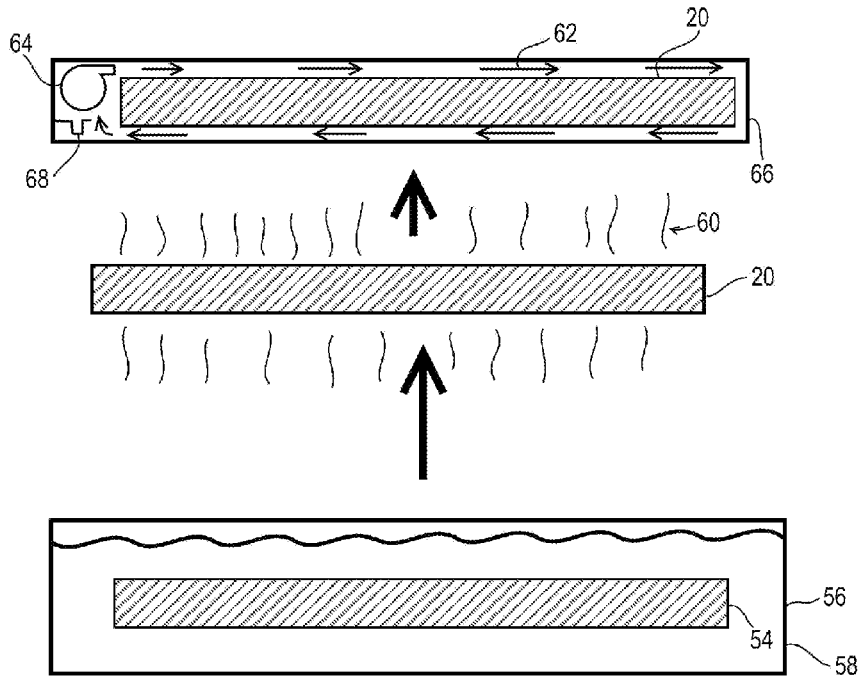
Fig. 5
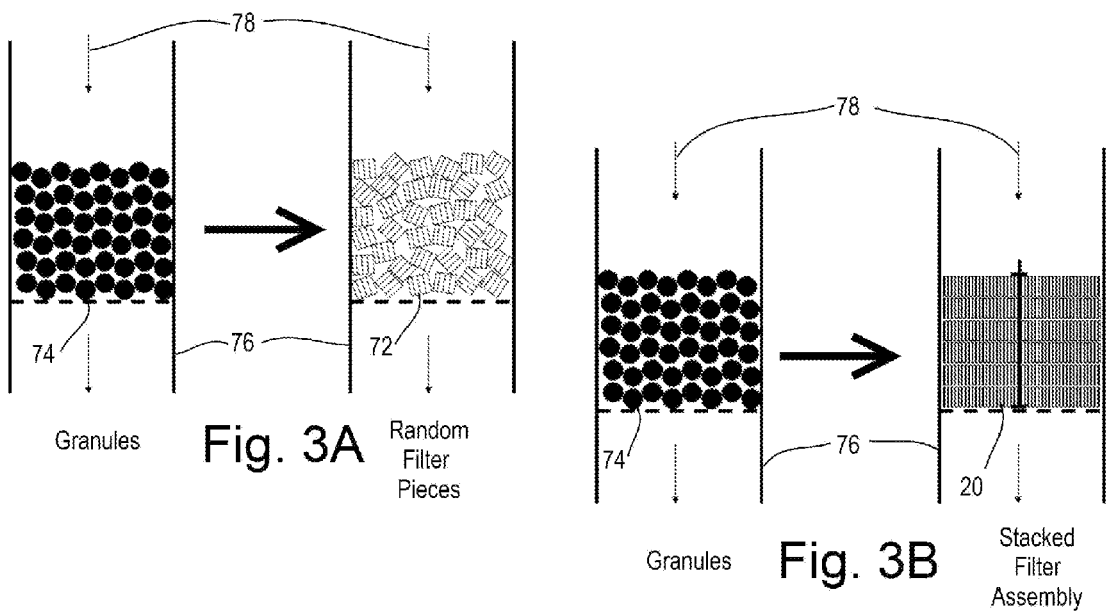

ND METHOD

BACKGROUND OF THE DISCLOSURE

Field of the Disclosure

This disclosure relates to the field of coatings for monolith style filters with an ozone depleting catalyst coating for use in an air handling system.

SUMMARY OF THE DISCLOSURE

It is known to reduce the content of ozone from a gas through the employment of ozone removing compositions which often contain ozone removing materials. Such materials can include, for example, ozone catalyzing compositions, ozone adsorbing or absorbing materials and equivalent compositions. The coating of such surfaces can be done by spraying, dipping, brushing and the like. Manganese oxides are known to catalyze the decomposition of ozone to form oxygen. Many commercially available types of manganese compound and compositions, including alpha (a) manganese oxide are disclosed to catalyze the reaction of ozone to form oxygen. In particular, it is known to use the cryptomelane form of alpha manganese oxide to catalyze the reaction of ozone to form oxygen. U.S. Pat. Nos. 6,214,303, 6,375,902 and 6,375,905 discuss uses of cryptomelane and are incorporated by reference herein in their entirety. Also nano gold can be applied in one ozone depletion process as described in US2008/193354A1.

In recent years public and private agencies have committed to reducing ozone levels in the atmosphere. Ozone levels in the ambient air at ground level are exceeding maximum allowable concentration limits. These high Ozone levels occur mostly in cities with high smog levels or with close proximity to industries. Exhaust air from industrial processes like corona discharge systems for plastic surface treatment (making it suitable for printing), ozone water treatment systems (residual ozone venting), ozone stack odor control systems, etc. need to be treated, but also ozone room odor or surface disinfection treatment systems, HVAC systems and public transportation ventilation systems, etc. need treatment for Ozone reduction in the environment.

In patent US2011038771 (A1) an ozone filter (type 'tortuous path') is described. Testing has shown that such a tortuous path filter is easily and quickly occluded with dust and ozone reduction will decrease in time. The aluminum monolith filter described in US2002/6,375,905(B1) eliminates the need for the air to follow a tortuous path, preventing friction and pressure drop, but has other disadvantages. A reduction of airflow is very minimal if the monolith ozone destruct filter is added to an existing air handling system (which normally includes particle filters) and since the monolith design does not trap particulates, the surface stays cleaner and ozone reduction will be kept high over time.

There is a need for a more economic polymer ozone destruct filter that is still energy efficient with low pressure drop and with high ozone destruct efficiency at ambient temperature.

BRIEF DESCRIPTION OF THE DRAWINGS

FIG. 1 is an isometric view of a treated filter according to one example of the disclosure.

FIG. 2 is a paired filter assembly including the filter of FIG. 1 and an electrostatically charged filter.

FIG. 3 is a side cutaway view of the paired filter of FIG. 2 in a housing with an air ionizer providing an ionic wind through the filter housing.

FIG. 3A is packed bed granule system converted to a random packed bed configuration.

FIG. 3B is a packed bed granule system converted to a monolith filter plate system.

FIG. 4 is an exploded face view of the treated filter shown in FIG. 1.

FIG. 5 is a highly schematic flow diagram of one method of treating the filters with an ozone depleting coating.

DESCRIPTION OF THE PREFERRED EMBODIMENTS

Figure 6:
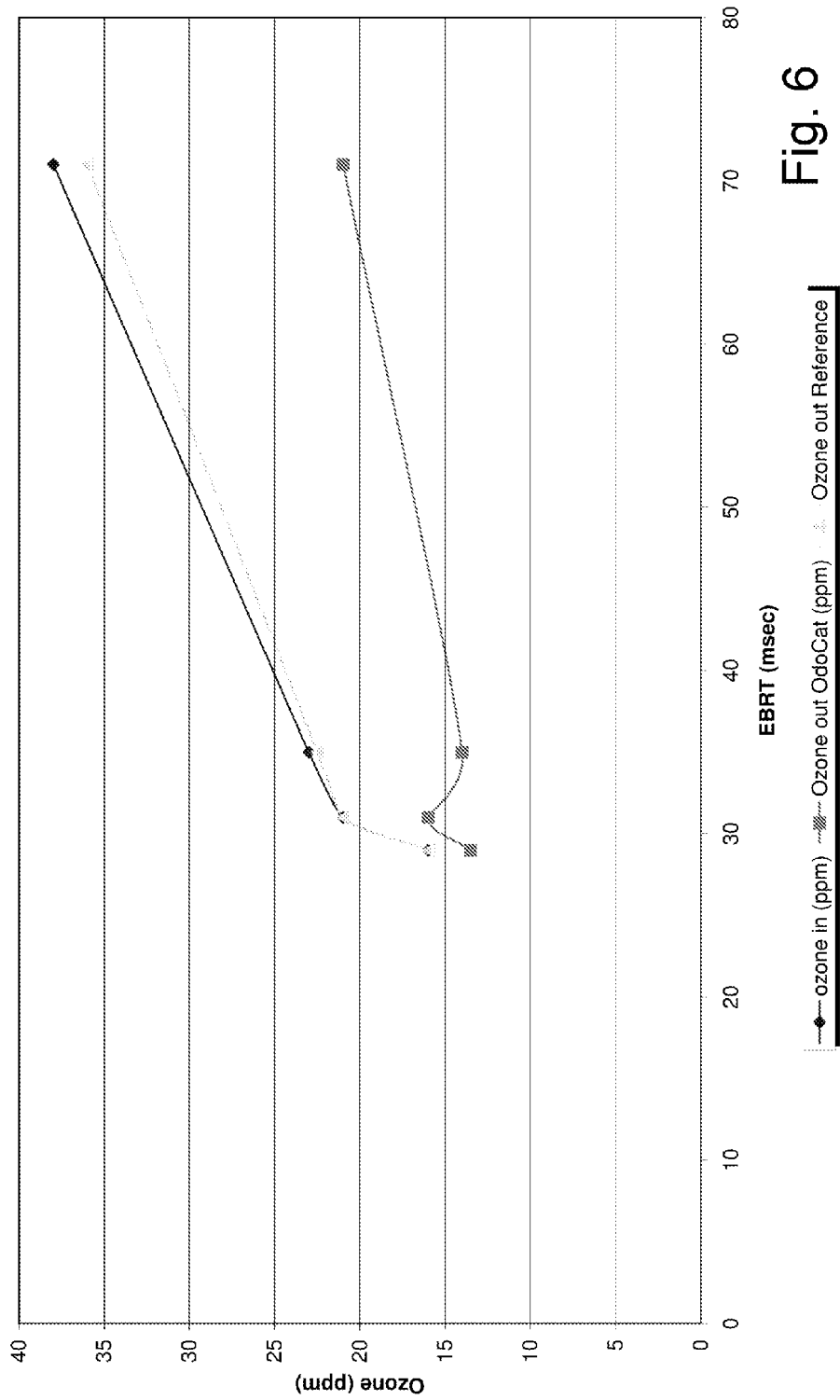
FIG. 6 is a graph showing the test results of Ozone concentration versus empty bed residence time at 68° F. (18° C.) Relative Humidity (RH) 70%.

Disclosed herein are several examples of filters utilizing an ozone-depleting catalyst for use in airflow applications. While filters utilizing such ozone depleting catalysts have been known in the art, such as disclosed in U.S. patent application Ser. No. 12/570,870 and U.S. patent application Ser. No. 12/853,738 (patent US2011038771(A1)) for example, such filters commonly utilized a tortuous path filter for low flow applications. Due to the high resistance of air through such a filter, they are not utilized in high flow applications as the size required for high-volume airflow is prohibitive.

In addition, pairing of an ozone depletion coated filter with electrostatic filter is disclosed herein such that the electrostatic filter is provided upstream of the ozone depletion coated filter so as to reduce the volume of particulates encountered by the ozone depletion coated filter and thus extending the useful life of the ozone depletion coated filter.

In addition, pairing of both the treated filter 20 as well as the combined treated filter 20 and electrostatically charged filter 22 with an air ionizer 24 providing an ion wind is disclosed herein so as to further reduce particulates in the air stream, reduce chemical contaminants in the air stream, and provide a low pressure airflow through the filter or paired filter. In such ion wind application, it may be desired to avoid use of any positive airflow machinery (fans) as such airflow machinery is commonly energy inefficient and commonly produces (undesired) sound.

The air ionizer component (with direct treatment as shown in the drawing or indirect with injected clean ionized air flow into a contaminated air flow) is especially beneficial to removal of contaminants in an airspace or industrial stack emissions. One detriment of such ion generators is the production of Ozone ($O_3$), therefore, the combination with an ozone reduction catalyst filter is further advantageous.

If other gaseous contaminants are present, the decomposition process of ozone can be beneficial to oxidize other contaminants; the decomposition of ozone to oxygen on the catalyst surface is generating oxygen radicals and these radicals can oxidize other contaminants that may be present in the air like hydrocarbons (formaldehyde, styrene, etc), carbon monoxide, hydrogen sulphide, mercaptans and odors that can be present as a cocktail of many different types of components, especially when the odor is of organic origin. Usually these odors have a very low mass concentration of sub-ppb (parts per billion) in one example 0.10 ppb up to about 100 ppb or 1,000 ppb if a strong odor source. Many odor components, like some mercaptans or amines, have extremely low odor detection threshold values of 0.10 ppb or even lower. So the ozone decomposing process with a catalytic surface can (partially) oxidize and break down gaseous contaminants. Since the odor concentrations in ppb are very low (although the odor intensity can be very high at these low ppb concentrations due to the extreme low detection threshold ppb value of many odors), the required ozone inlet concentration can be low. At low ozone inlet concentrations <1,000 ppb or even at <100 ppb from the ionizer (or ozone generator or ozone present in the ambient air) the ozone ppb value can be much more than the odor ppb value of the odor component(s) and the ozone destruct process on the catalyst surface can clean the air just as nature does, only faster.

As shown in FIG. 3A: random packed bed configuration; (usually used for industrial exhaust emissions, similar to packed bed scrubbers with Pall rings or Raschig rings) a container or vertical tube filled with small pieces (filter cut to small cubicles size 1/8" up to 2' cubicles=H×W×L) of the ozone filter randomly oriented on a bottom of mesh wire or perforated plate, usually vertically oriented air flow up or down with or without electrostatic prefilter (electrostatic prefilter not randomly packed). Such a filter can replace ozone catalyst granules that are usually in packed bed configuration. This arrangement will have less pressure drop (energy savings) than granules due in part to the corrugated shape of the disclose filter arrangement resulting in large surface area and air pockets. This will also have less weight and system design savings compared to granules.

FIG. 3B is an example of a packed bed granule system that is changed into a monolith filter bed with multiple monolith filter plates (cut to a size that will fit the container or tube) stacked on top of each other, glued or clamped or fabricated to one piece. The advantage of this configuration is that even more surface area is created with one filter or multiple filter segments that is still light weight, less pressure drop (energy use) easy to handle, and easy to replace.

Figure 7:
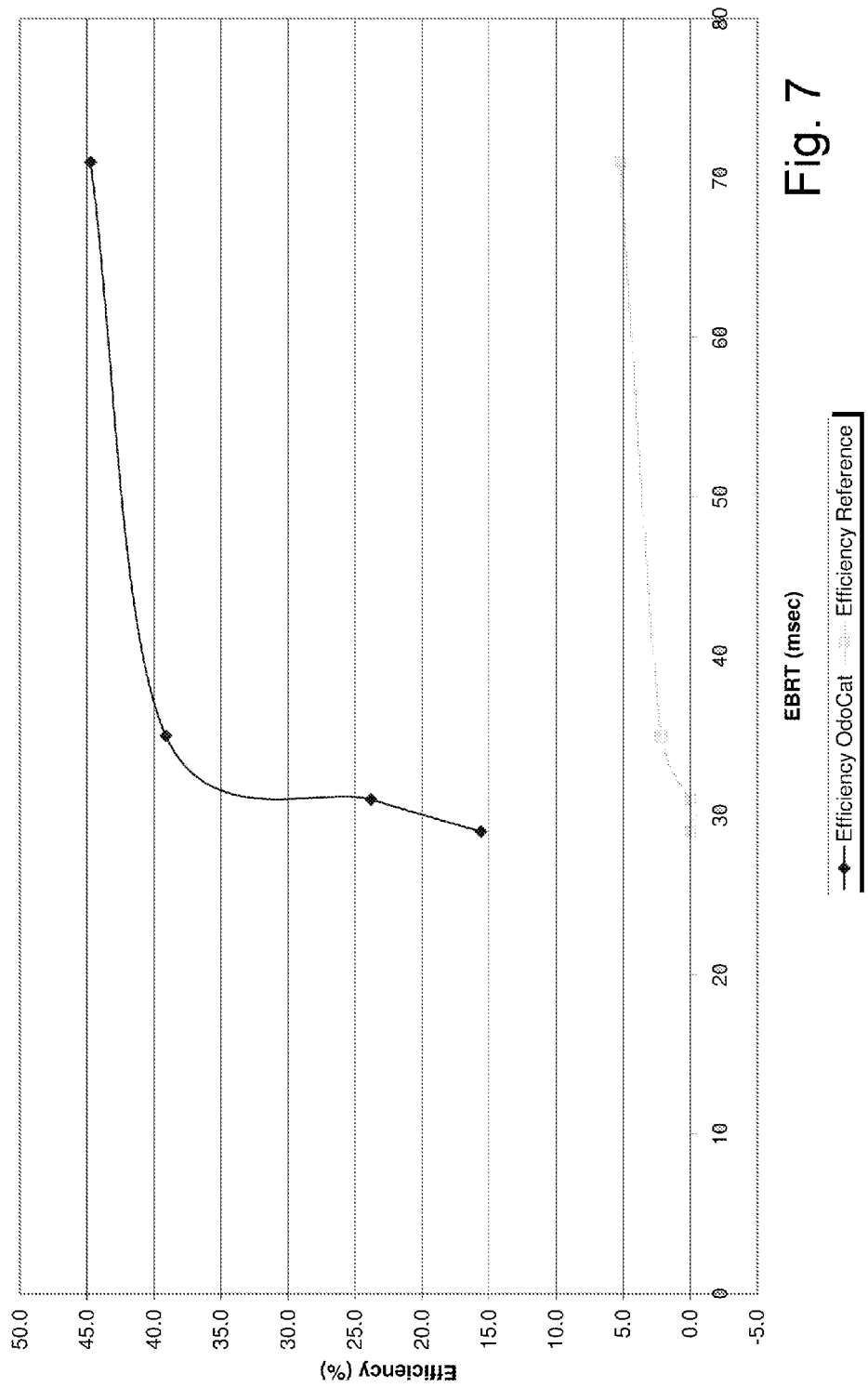
FIG. 7 is a graph showing efficiency of Ozone reduction versus empty bed residence time.
Figure 8:
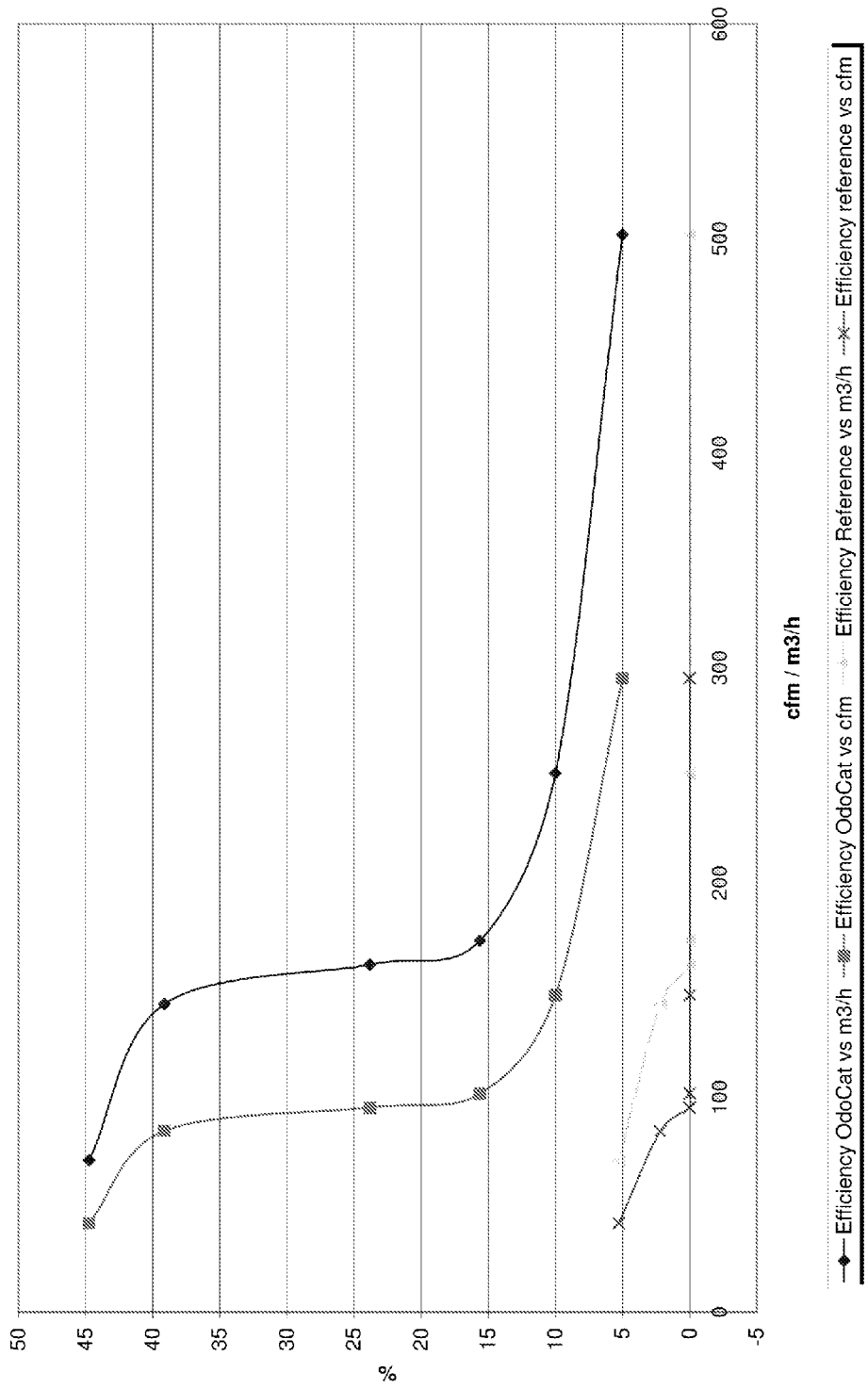
FIG. 8 is a chart showing efficiency of a standard size filter (12"×8"×10 mm) versus airflow.
Figure 9:
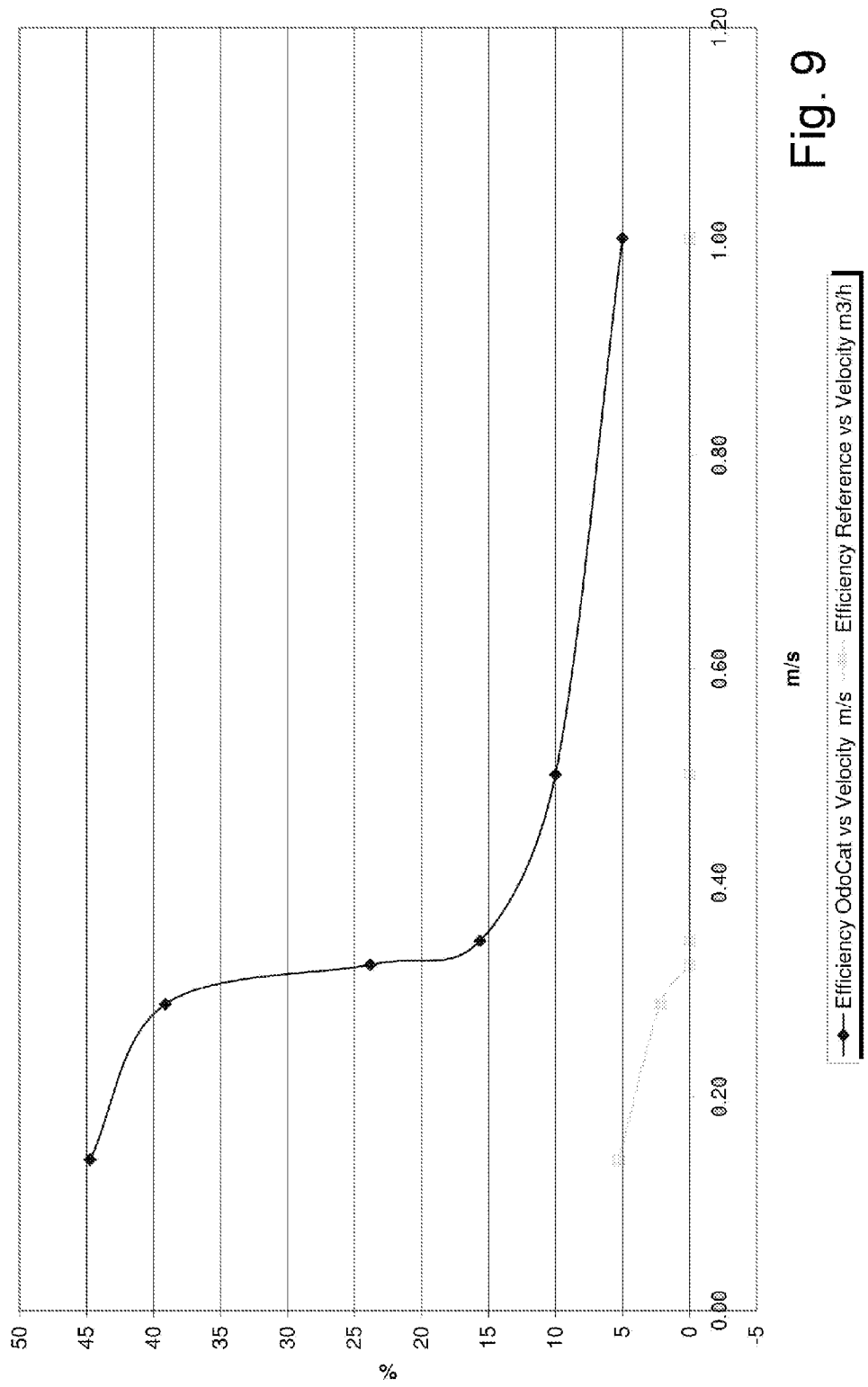
FIG. 9 is a chart showing efficiency of a standard filter (12"×8"×10 mm) versus airflow.
Figure 10:
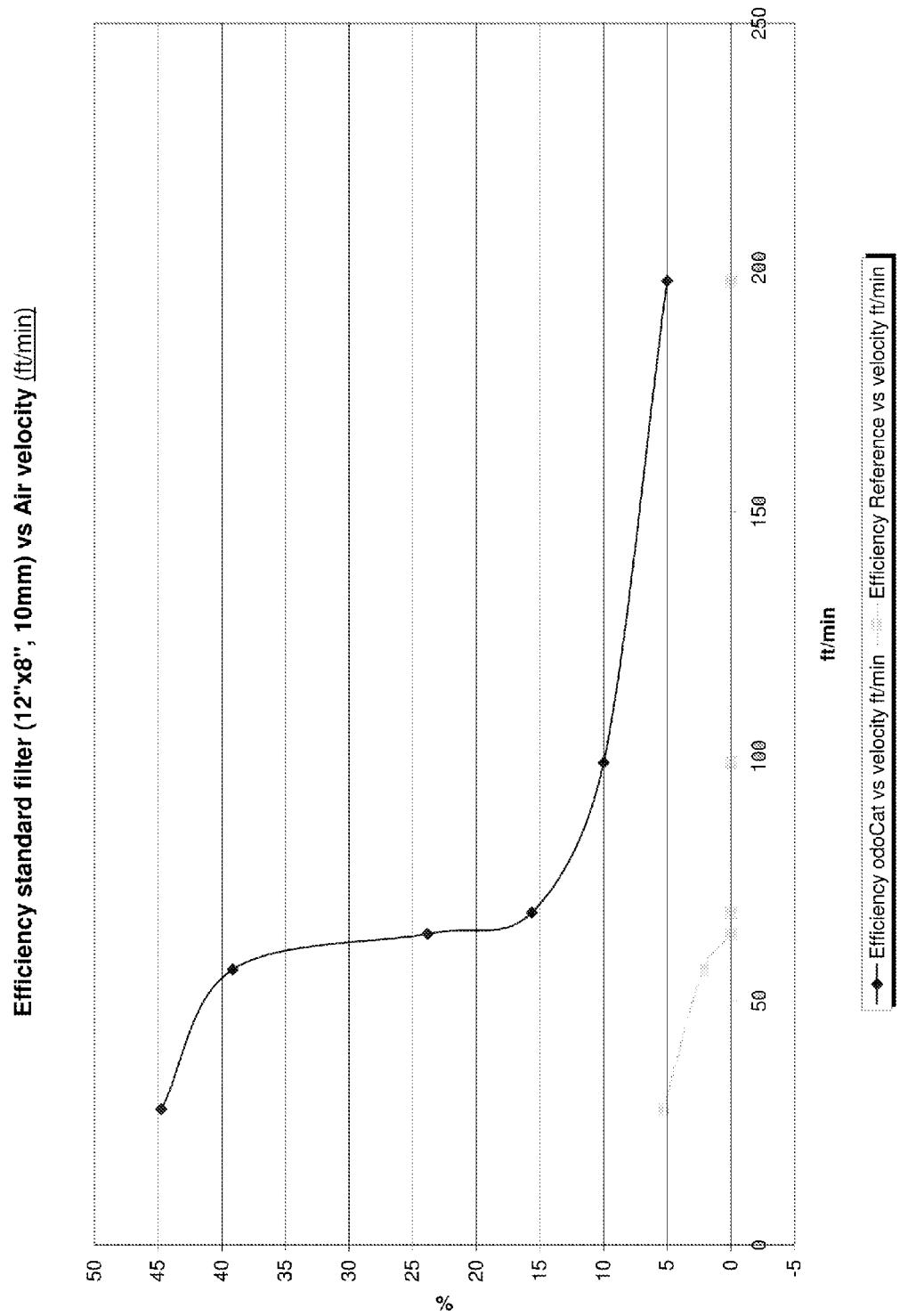
FIG. 10 is a chart showing efficiency of a standard filter (12"×8"×10 mm) versus air velocity (ft/min).
Figure 11:
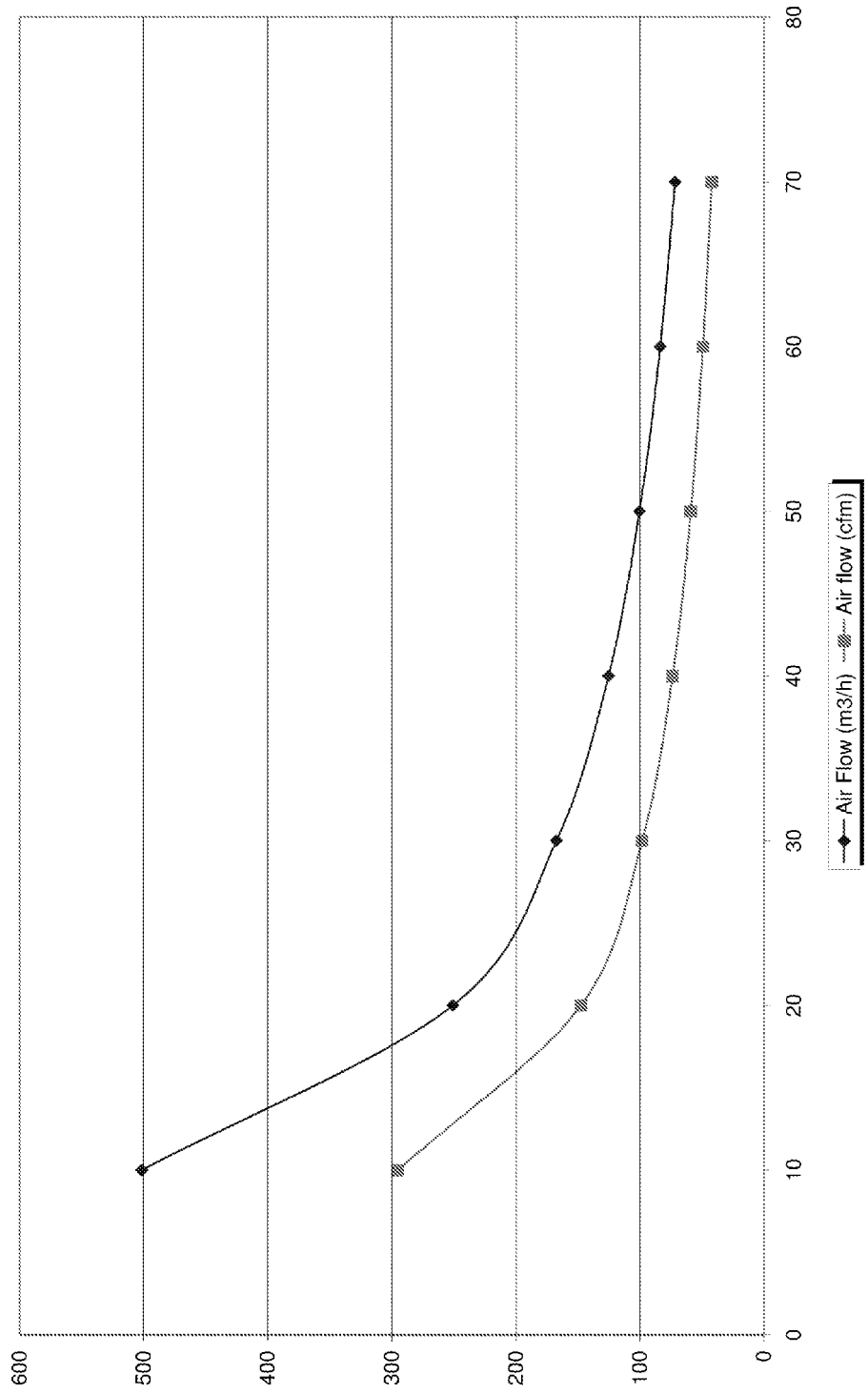
FIG. 11 is a chart showing empty bed residence time versus air flow using a standard size filter (12"×8"×10 mm).

In (graphs) FIGS. 6 to 10: The coated ozone filter (as mentioned in coating example description) is compared to an electrostatic filter with the same filter lay-out and material but without described coating and with an ozone catalyst powder (hopcalite) which is only electrostatically bonded thereto.

In a closed environment such as a room or substantially closed building, the air being processed may pass multiple times through the filter assembly, reducing the efficiency required at each pass. Such a filter assembly oxidizes contaminants and odor, and increases health benefits due to removal of contaminants and Ozone.

Looking to FIG. 1 is shown a treated filter 20 having an upper edge 26, lower edge 28 as well as side edges 30 and 32. While the filter 20 can operate in any orientation the sides of each filter are disclosed to facilitate explanation of the apparatus either in relation to an electrostatically charged filter 22 and/or in relation to a housing 34. Looking to FIG. 2, it can be appreciated that the electrostatically charged filter has an upper edge 36 adjacent the upper edge 26 of the treated filter 20 when the filters 20, 22 are used in a paired arrangement. As the electrostatically charged filter 22 may be detrimentally affected by contact with a metallic surface (such as the coating on the treated filter 20), especially a grounded metallic surface, it will be desirous to have a gap 38 there between in many applications. Continuing with a description of FIG. 2, it can be understood that the electrostatically charged filter has sides 40 and 42 adjacent and substantially parallel to sides 30 and 32 of the treated filter 20 respectively when installed adjacent there to. Likewise, the electrostatically charged filter 22 has a bottom edge 44 adjacent and substantially parallel to the bottom edge 28 of the treated filter 20 when installed adjacent thereto given a direction of airflow 46. Looking to FIG. 3, a plurality of filters 20 and 22 can be seen within a housing 34. Generally speaking, such housings 34 comprise a U-shaped portion 48, or plurality of U-shaped portions for sliding engagement of the filters 20/22 therein. Such arrangement allows for easy removal and replacement of such filters.

As the filters 20/22 in one example are of an open mesh arrangement (such as shown in FIG. 4) wherein each of the webbing portions 50 provides a rather large opening 52 through the filter 20/22 it is generally conceived that in such arrangements high volume airflow may allow many of the charged particulates to pass through the electrostatically charged filter 22. In one form, the openings measure 1/8"±1/16" or larger. Likewise such high-volume airflow may allow a larger concentration of ozone to pass through the treated filter 20 without the ozone being depleted thereby. Thus, as shown in FIG. 3 it is conceived that an air ionizer 24 can be utilized to provide the airflow 46 as an ion wind.

One such disclosure for an apparatus 24 generating such an ionic wind is disclosed in U.S. Pat. No. 4,643,745. As such ion winds are generally low pressure and low flow such a combination of an air ionizer 24 with either a treated filter 20 or paired electrostatically charged filter 22 and treated filter 20 have been found to the advantageous in the field of reducing contaminants in the air.

Looking to FIG. 5 is shown a highly schematic flow diagram of one method of treating a high airflow filter 54 by immersing the filter 54 in a solution 56 housed within a bath 58. In one form, the solution is a metallic solution in demineralized water. In one example the solution comprises manganese acetate or manganese nitrate and the immersion time in one example depends on temperature but is at least 1 hour at ambient temperature. In one form, the manganese acetate comprises 25% of the solution by weight and the manganese nitrate comprises 50% of the solution by weight.

The filter 54 is of the same construction as shown in FIG. 4 with an open mesh providing high airflow and low restriction to said airflow. In this disclosure, the filter 54 is the filter 20 prior to application of the ozone-depleting coating. Recent innovations in such filters have enabled a microstructure surface designed to increase the surface area of an electrostatically charged filter. One such air filter surface has been developed by the 3M™ corporation as a "High Air Flow (HAF) Air Filter" described in patent WO2011041144 (A2). Testing has shown that such microstructure is particularly beneficial to the coatings disclosed herein. Once coated, the label 20 will be utilized to describe this filter component. The second stage of the process shown in FIG. 5 is drying of the treated filter to remove fluid components 60 therefrom. In at least one application, a fresh air supply needed and an exhaust for humid air to replace humid air with dry air in the drying process which is below melting temperature of the filter material.) This substantially leaves the manganese acetate and manganese nitrate and other solid components upon the surface of the filter 54. In some prior applications, conversion of a filter for ozone depletion utilizes a step of dusting a dry material upon the electrostatic filter. In one example, hopcalite can be utilized. Hopcalite was utilized as a reference in the graphs (FIG. 6-10). While this step in some applications retains the electrostatic qualities of the filter, it is been found that a less than satisfactory ozone depletion coating is normally provided on the surface. Therefore, the immersion process shown herein has been found to be much more effective in properly coating the filter 54. Such a conductive coating often is terminally destructive to the electrostatic qualities of the filter 54. It is generally desired for dust not to settle on the conductive catalytic surface in order to prevent covering the catalytic surface with dust which would decrease the lifetime. Thus, as shown in FIG. 3, a separate electrostatically charged filter 22 may be utilized for particulate removal upstream.

FIG. 5 also shows the treated filter 20 being subjected to convection airflow 62 provided by a fan 64 within a housing 66. In one form, heat may be applied by way of a heater 68 to facilitate the calcination treatment of the coating 70. In one example, the coating is dried for at least 1 hour depending on air flow, temperature and filter volume. In one form, the housing 66 is a high ozone environment >20 ppm which oxidizes the metal coating, in one example for at least 1 hour. In some applications, it will be desired to keep the temperature low as the filter 54 is of a polymeric (plastic) composition which would melt in a high-temperature environment commonly used in deposition or calcination of manganese oxide coatings. In some applications, conversion of the manganese acetate and manganese nitrate to manganese oxide is a heat generating process wherein it may be desired to remove such heat to avoid melting of the filter material.

The above mentioned example is a low cost procedure and if required this can be repeated with multiple layers or combined with additional procedures like nano gold or platinum, etc. as disclosed above.

FIG. 3A shows a prior art packed bed granule system converted to a random packed bed configuration. In this example, the treated filter disclosed above may be provided in small segments 72, or cut into small segments 72 and then utilized in place of prior granules 74 within the same housing 76, with an airflow 78 there through.

FIG. 3B shows a prior art packed bed granule system converted to a monolith filter plate system. In this example, a plurality of filters 20 are provided in the housing 76 to replace the granules 74.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore, I claim:

1. A method for making an economical ozone depletion filter that is energy efficient (with low pressure drop open mesh monolith structure) with at ambient temperature by treating an open mesh filer for ozone filtration and oxidation of gaseous contaminants in the presence of ozone at ambient temperature, the method comprising the steps of:
 providing an open mesh microstructure filter having;
 soaking the open mesh microstructure filter in a solution of Manganese Acetate $Mn(CH_3COO)_2$ and/or Manganese Nitrate $Mn,(NO_3)_2$;
 removing the open mesh microstructure filter from the solution;
 allowing the fluid components to evaporate from the open mesh microstructure filter
 inserting the coated filter into an Ozone ($O_3$) environment to as to provide a Manganese Dioxide ($MnO_2$) coating on the open mesh microstructure filter.

2. The method as recited in claim 1 wherein the steps are repeated to produce overlying coating layers on the open mesh microstructure filter prior to use.

3. The method as recited in claim 1 further comprising a step of applying a layer comprising nano gold to the open mesh microstructure filter.

4. The method as recited in claim 1 wherein the provided open mesh microstructure filter is a passively electrostatically charged filter and wherein the coating process electrostatically neutralizes the provided open mesh filter.

5. The method as recited in claim 1 wherein the provided open mesh microstructure filter is a polymeric material.

6. The method as recited in claim 5 wherein the Ozone ($O_3$) environment is provided with air flow and heat reduction to avoid melting of the polymeric material.

7. The method as recited in claim 1 further comprising the step of cutting the treated open mesh microstructure filter into small pieces for use in random packed bed filtration or for fabricating the open mesh microstructure filter into alternate shapes/volumes.

8. A filter assembly for particulate and ozone filtration at ambient temperature and oxidation of gaseous contaminants in the presence of ozone at ambient temperature, comprising:
 an open mesh passively charged electrostatic filter;
 an open mesh ozone depletion filter provided downstream of the open mesh electrostatic filter;
 wherein the open mesh ozone depletion filter is formed by the process of:
  providing a open mesh microstructure filter;
  soaking the open mesh microstructure filter in a solution of;
  removing the open mesh microstructure filter from the solution;
  allowing fluid components of the solution to evaporate from the open mesh microstructure filter;
  inserting the coated open mesh filter into an ozone ($O_3$) environment to as to provide an ozone depleting catalytic coating on the open mesh microstructure filter.

9. The filter assembly as recited in claim 8 wherein the soaking solution comprises: Manganese Acetate $Mn(CH_3COO)_2$ and/or Manganese Nitrate $Mn,(NO_3)_2$.

10. The filter assembly as recited in claim 9 wherein the soaking solution comprises: between 25% and 35% by volume Manganese Acetate $Mn(CH_3COO)_2$ and/or between 45% and 55% Manganese Nitrate $Mn,(NO_3)_2$.

\* \* \* \* \*